US007936813B2

(12) United States Patent
Chen

(10) Patent No.: US 7,936,813 B2
(45) Date of Patent: May 3, 2011

(54) DIVERSITY GMSK-RECEIVER WITH INTERFERENCE CANCELLATION AND METHODS THEREIN

(75) Inventor: Weizhong Chen, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 903 days.

(21) Appl. No.: 11/895,098

(22) Filed: Aug. 23, 2007

(65) Prior Publication Data
US 2009/0052517 A1 Feb. 26, 2009

(51) Int. Cl.
*H03H 7/30* (2006.01)
*H03K 5/159* (2006.01)
*H03D 3/00* (2006.01)
*H04L 27/14* (2006.01)
*H04L 1/02* (2006.01)
*H04B 1/10* (2006.01)

(52) U.S. Cl. ......... 375/235; 375/336; 375/347; 375/350

(58) Field of Classification Search .................. 375/274, 375/336, 235, 267, 347, 350; 455/132, 137, 455/272, 278.1, 296, 303
See application file for complete search history.

(56) References Cited

U.S. PATENT DOCUMENTS 7,295,636 B2* 11/2007 Onggosanusi et al. ....... 375/350
7,450,924 B1* 11/2008 Mostafa et al. ............... 375/350

OTHER PUBLICATIONS

Kobylinski, Mostafa &Ghosh, "Multiple Antenna Interference Cancellation (MAIC) Advanced Receiver for GSM Networks",WNCG, Oct. 20-22, 2004, pp. 1-7, Austin, TX.

* cited by examiner

*Primary Examiner* — Betsy L Deppe

(57) ABSTRACT

Method in a diversity antenna GMSK receiver of determining interference canceling equalizers and corresponding equalizers are described. The method includes providing a plurality of GMSK received signals; de-rotating and splitting each of the plurality of received signals into in phase and quadrature parts to provide a multiplicity of real valued branches; calculating linear equalizers for each of a multiplicity of subsets of the multiplicity of real valued branches; and providing an interference canceling equalizer for each of the multiplicity of real valued branches, each interference canceling equalizer corresponding to a weighted combination of the linear equalizers. A corresponding equalizer includes eight linear equalizers processing four branch signals corresponding to real (I) and quadrature (Q) parts of a GMSK diversity signal from two antennas.

19 Claims, 5 Drawing Sheets

DIVERSITY GMSK-RECEIVER WITH INTERFERENCE CANCELLATION AND METHODS THEREIN

FIELD OF THE INVENTION

This invention relates in general to receivers and more specifically methods in a diversity receiver for Gaussian Minimum Shift Keyed (GMSK) signals for interference cancellation and corresponding apparatus.

BACKGROUND OF THE INVENTION

Receivers for radio frequency signals are known and receivers for GMSK signals are known. Such receivers are used for some equipment that is employed in Global System for Mobile communications (GSM) systems. Generally these receivers require some form of interference cancellation. One technique for interference cancellation that has been used is referred to as a linear equalizer, wherein the effects of the channel are modeled by filters that independently process a real or in phase part and an imaginary or quadrature part of the received signal. Normally a training sequence included with a GSM transmission is used by the receiver to define the two filters.

Diversity receivers operating to receive multiple copies of a signal, when properly implemented, are known to provide improved performance in fading environments. Directly applying linear equalizer techniques to each signal in a diversity receiver for a GMSK signal as defined in GSM standards is known to be sub-optimum. Given the length of the training sequence there are not enough known points to determine the number of parameters required to jointly define linear equalizers in a GMSK diversity system.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communication equipment and GMSK diversity receivers with interference cancellation used therein. Processes and apparatus for determining interference canceling equalizers which provide improved performance and efficient implementation (reduction in resources needed for defining the equalizer) are discussed. More particularly various inventive concepts and principles embodied in methods employed within and corresponding Multiple Antenna Interference Cancellation (MAIC) equalizers and receivers will be discussed and disclosed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including digital signal processors, possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
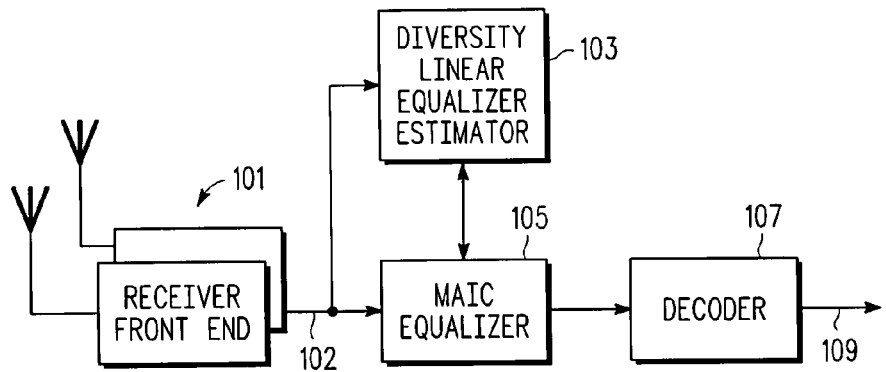
FIG. 1 depicts in a simplified and representative form, a high level diagram of a receiver including interference cancellation in accordance with one or more embodiments.

Referring to FIG. 1, a simplified and representative high level diagram of a receiver including an interference canceling equalizer in accordance with one or more embodiments will be briefly discussed and described. FIG. 1, shows a receiver front end 101 that receives a transmitted signal, e.g., as signals from two or more antennas, and then amplifies, filters, and converts or translates those signals to a lower frequency and normally also converts the resultant analog signals to base band digital signals, $x_n$ at 102. Note that the front end will be duplicated once for each antenna, e.g., two front ends for two antennas, as suggested by the plurality of front end blocks and antennas. A baseband signal will be provided from each front end, i.e., for each antenna. The base band signal for a GMSK receiver will include a plurality of complex samples, typically 2 samples, for each symbol period. The baseband signal, $x_n$, from the receiver front ends is coupled to a diversity linear equalizer estimator 103 or estimation function as well as a MAIC interference canceling equalizer 105. The output from the interference canceling equalizer 105 is provided as soft information (soft bits or symbols, i.e. a symbol together with confidence information) to a decoder 107 that handles error correction, etc, and provides received bits or data that are coupled to further functions, e.g., media access control (MAC), etc.

The baseband signal, $x_n$, received by the receiver from each antenna can be represented as follows $$x_n = \sum_{i=0}^{L-1} h_i I_{n-i} + \eta_n \quad (1)$$

where $h_n$ is the Composite Channel Pulse Response (CPR) of L symbol periods, including the effects of the transmitted symbol pulse, multi-path fading, and receiver filters; $I_n$ is the information sequence, and $\eta_n$ represents the combination of Additive White Gaussian Noise (AWGN), co-channel interferences and adjacent channel interferences. In, e.g., a GMSK signal transmission, the length of the CPR can be as long as 9.4 symbol periods in harsh fading, such as Hilly Terrain (HT) and Rural Area (RA) as defined in 3GPP standards.

Figure 2:
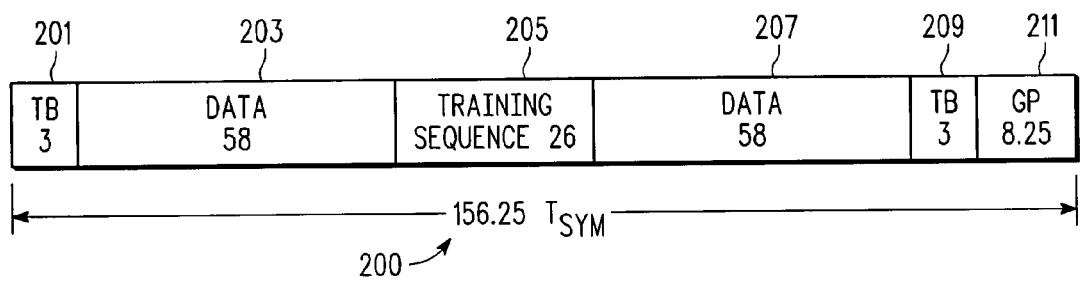
FIG. 2 depicts a diagram of bit allocation in an exemplary GMSK burst transmission.

Referring additionally to FIG. 2, a diagram of bit allocation in an exemplary GSM GMSK burst transmission will be briefly discussed and described and used to further describe the estimator and equalizer of FIG. 1 and others. FIG. 2 shows one burst in a GSM system, where the specific modulation for the burst can be, e.g., EDGE or GMSK. It is understood that other systems and air interface standards may have other allocation maps. The GMSK burst occupies or has a duration of or spans 156.25 symbol periods 200 or 156.25 bit periods or bit times at 1 bit per symbol. In GMSK, each burst duration is equivalent to 577 micro-seconds. As shown, the GMSK burst includes and spans 3 tail bits 201, a first data field 203 that includes or spans 58 bits, a training sequence 205 of 26 bits, a second data field 207 that includes or spans 58 bits, 3 more tail bits 209, followed by a gap 211 equivalent to 8.25 bit times. The training sequence is a predetermined sequence of symbols or bits as specified in the relevant standards, e.g., GMSK standards. As is known and specified in the various air interface standards for GMSK systems, 8 bursts comprise one Time Division Multiplex Access (TDMA) frame, which is transmitted via one radio frequency carrier. Different TDMA frames may be frequency hopped on different radio frequency carriers. Twenty-six (26) TDMA frames comprises one multiframe. Fifty-one multiframes are included in a superframe and 2048 superframes are included in a hyperframe. In GMSK each bit is transmitted as one of two symbols (±1) with a symbol rotation of π/2. A given symbol or the resultant energy for that symbol will impact 4 symbol or bit times.

The linear equalizer estimator 103 or estimation process generally provides filter coefficients for two filters for each received signal as well as timing information based on the received signal $x_n$ corresponding to the training sequence and the known training sequence $I_n$ 205 for each transmitted and thus received burst, using one or more generally known techniques, e.g., Minimum Mean Square Error (MMSE) or Weighted MMSE. The equalizer 105, given the timing information and filter coefficients from the linear estimator, generally operates or functions to remove or reduce distortion or interference in the received symbols or bits. The training sequence by being placed in the middle of a burst allows information symbols closest to the training sequence to facilitate reduction of the impact of channel variations over or during the burst. With this arrangement of the training sequence, the equalizer can operate or adjust or compensate in both directions, i.e., from the training sequence to or across earlier received data or the first data field 203 as well as from the training sequence to or across later received data or the second data field 207, and thereby better account for channel variations over the time duration or span of the received signal burst (or burst of the received signal).

Figure 3:
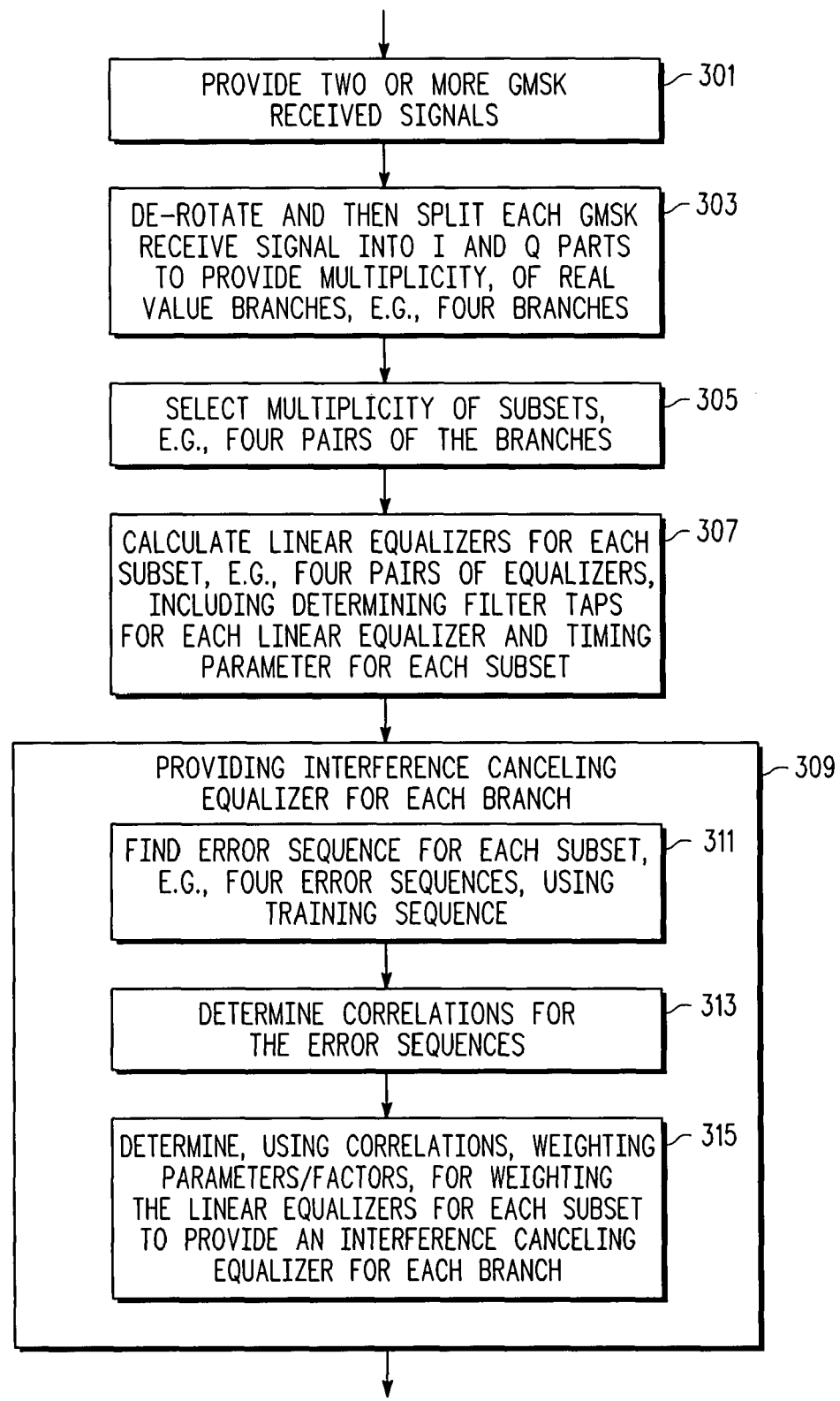
FIG. 3 shows a flow chart illustrating representative embodiments of methods, in a diversity antenna GMSK receiver, of determining interference canceling equalizers in accordance with one or more embodiments.

Referring to FIG. 3, a flow chart illustrating representative embodiments of methods, in a diversity GMSK receiver, of determining interference canceling equalizers according to various embodiments will be discussed and described. FIG. 3 begins with providing a plurality of GMSK received signals 301, e.g., one GMSK received signal or burst for each of a plurality of antennas. This would include providing a first and second GMSK received signal or burst from a, respective, first and second antenna and it will be appreciated that each GMSK received signal or burst will include a training sequence or training symbol sequence.

FIG. 3 next executes a process of de-rotating and splitting each of the plurality of GMSK received signal into in phase (I) and quadrature (Q) parts or components to provide a multiplicity of real valued branches 303. For a first and second GMSK signal, splitting these signals into I and Q parts provides four real valued branches. The method at 305 shows selecting a multiplicity of subsets of the multiplicity of real valued branches. Generally subsets should be selected which avoid redundant information. For a two signal or two antenna system with four real valued branches six pairs of subsets can be made, however only four of these pairs avoid redundant information. Thus four pairs of branches are selected from the four real valued branches. This will be discussed more below with reference to FIG. 4.

Given the multiplicity of subsets, 307 shows calculating linear equalizers for each of the multiplicity of subsets of the multiplicity of real valued branches. The calculating can comprise determining a plurality of filter taps for each equalizer and a timing parameter for each subset. In one embodiment this is done by calculating the linear equalizers at each of a plurality of time trials to determine the timing parameter. For example, at each timing trial, a timing error value is found and the timing parameter is the one associated with the timing trial with the best or lowest timing error value. For two antennas, this can mean calculating first and second linear equalizers for each of four unique pairs of branches as selected at 305, thus providing eight linear equalizers. The calculating can include determining a plurality of filter taps for each linear equalizer and a timing parameter for the first and second linear equalizer for each unique pair of branches, e.g., four timing parameters one for each of the four pairs of branches. Generally the calculating linear equalizers is performed using the training sequence observations as received in the multiplicity, e.g., first and second, of GMSK signals as compared to a known training sequence. These concepts will be further discussed below with reference to FIG. 5.

The method at 309 shows providing an interference canceling equalizer for each of the multiplicity of real valued branches, with each interference canceling equalizer corresponding to a weighted combination of the linear equalizers. For two signals or antennas, 309 amounts to providing an interference canceling equalizer for each of the four real valued branches, with each interference canceling equalizer corresponding to a weighted combination of two of the eight linear equalizers. Given the interference canceling equalizer for one of the branches it can be used to cancel interference for that branch. Generally the equalizer is provided or developed using the training sequence and then used to process the balance of a burst including the two data fields.

In one or more embodiments, the providing the interference canceling equalizer can further comprises one or more of finding error sequences for each subset 311, determining correlations for the error sequences 313, and determining weighting parameters from the correlations 315. The finding an error sequence 311 can includes finding an error sequence corresponding to the linear equalizers for each of the multiplicity of subsets to provide a multiplicity of error sequences, where the error sequence depends on a training sequence, e.g., the known training sequence or bits. In one or more embodiments with two antennas, this is finding an error sequence corresponding to the first and second linear equalizers for each of the four unique pairs of branches to provide four error sequences.

Thus, providing each of the interference canceling equalizers can further include weighting the linear equalizers dependent on relationships among the multiplicity of the error sequences. For two antennas and GMSK signals, the providing each of the interference canceling equalizers further comprises weighting the linear equalizers dependent on relationships among the four error sequences. One such relationship can be expressed as a correlation between the error sequences and thus 313 shows determining such correlations, i.e., determining correlations between the multiplicity of error sequences corresponding to the linear equalizers for each of the multiplicity of subsets. In systems with two antennas this amounts to determining correlations between the four error sequences. Given the correlations, determining corresponding weighting parameters or factors for weighting the linear equalizers to provide the interference canceling equalizer for each of the multiplicity of real valued branches is shown at 315. In two antenna systems 315 can amount to determining, using the correlations, corresponding weighting parameters for weighting the two linear equalizers to provide the interference canceling equalizer for each of the four real valued branches. These techniques and processes are discussed further below with reference to FIG. 6 and FIG. 7.

Figure 4:
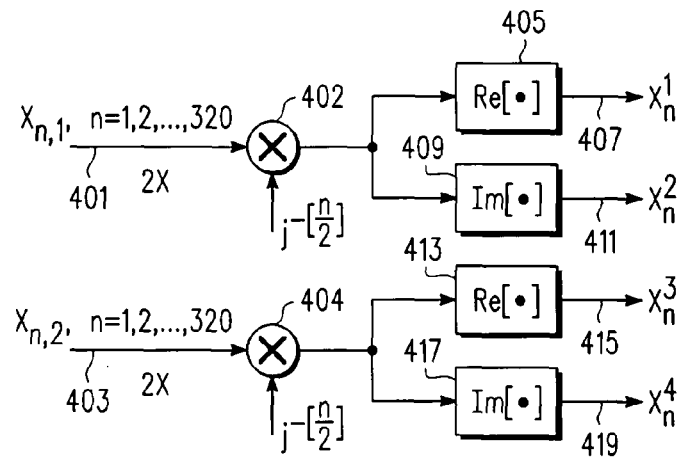
FIG. 4 depicts in a representative manner, the formation of branches and subsets of those branches corresponding to diversity signals in a GMSK receiver in accordance with one or more embodiments.

Referring to FIG. 4, a representative view of the formation of branches and subsets of those branches corresponding to diversity signals in a GMSK receiver in accordance with one or more embodiments will be discussed and described. FIG. 4 shows a GMSK signal from a first antenna at input 401 as converted to baseband and sampled at a 2X or 2 samples per symbol rate to provide 320 samples for one burst of the GMSK signal. This is a complex signal that is applied to a de-rotator 402 where each sample is multiplied by the appropriate de-rotation parameter. After de-rotation these signals are split into their respective real (I) and imaginary or quadrature (Q) parts. This is reflected for the first signal at input 401 in a Re[ ] function 405 to yield or provide $x_n^1$ at 407 and a Im[ ] function 409 to provide $x_n^2$ at 411. A similar signal from a second antenna at input 403 is applied to de-rotator 404 and then split via a Re[ ] function 413 to provide $x_n^3$ at 415 and via an Im[ ] function 415 to provide $x_n^4$ at 417. These four branches are then treated or considered as four distinct signals, i.e. signals from 4 antennas. Each subset or in this example, pair of these branches can apply SAIC linear equalizer techniques to estimate soft symbols. Selecting two at a time from a total of four results in a possible 6 pairs of these branches. Considering dependencies, four unique subsets or pairs can be chosen from these four branches. Specifically, with the numbers referring to superscripts for $x_n$, 12, 14, 23, and 34 or 12, 13, 24, and 34 can be selected or chosen as four unique pairs. The number of branches within a pair is determined by the rule of thumb that number of equations should be about 3 times the number of unknowns so that the Minimum Mean Square Error (MMSE) solution for the unknowns will have decent accuracy. In our case, with 2 branches as a subset, since each branch needs one real-valued equalizer which has 5 taps or 5 unknowns, thus the 2 branches have two real-valued equalizers which have 10 taps or 10 unknowns. The number of equations is determined by the number of training symbols, which is fixed at 26 given by the 3GPP specification. Thus, two branches for a subset provide a number of equations that approaches 3 times the number of unknowns.

Figure 5:
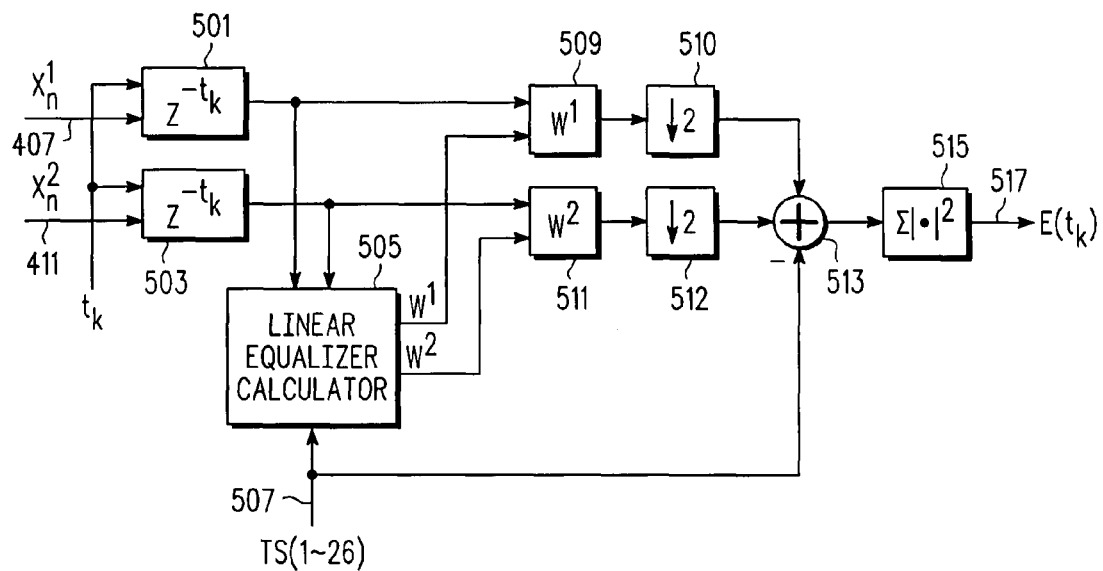
FIG. 5 shows an apparatus for calculating linear equalizers associated with the subsets in accordance with one or more embodiments.

Given the selected subsets and referring to FIG. 5, an apparatus and processes for calculating linear equalizers associated with the subsets in accordance with one or more embodiments will be discussed. These equalizers are determined over the training symbol sequence portion of the received signal and results in the linear equalizer for each branch of the pair as well as the timing parameter for the pair $\{(w_1^k, w_2^k, \tau_k), k=1,2,3,4\}$. FIG. 5 shows one pair of branches, specifically the pair 12, i.e., the signals $x_u^1$ at 407 and $x^2$ at 411, each input to a respective delay stage 501, 503 which applies a $t_k$ delay, where $t_k$ is typically in symbol times, i.e. +/−1, 2, 3, or more symbols. The outputs from the delay stages 501, 503 are, respectively, coupled to the linear equalizer calculator 505 as well as linear filters 509, 511 (linear equalizer when appropriately configured with coefficients $w^1$, $w^2$ as provided by the calculator 505). The linear equalizer calculator also uses the known training symbol sequence provided at 507. In one embodiment the coefficients for each filter are five taps for a digital filter (Finite Impulse Response {FIR}). These filter taps can be calculated by solving the following equation with MMSE approach where x is at 2X and s is at 1X sample rate:

$$\begin{bmatrix} \hat{s}_1 \\ \hat{s}_2 \\ \hat{s}_3 \\ \vdots \\ \hat{s}_{26} \end{bmatrix} = \begin{bmatrix} x_5^1 & x_4^1 & x_3^1 & x_2^1 & x_1^1 \\ x_7^1 & x_6^1 & x_5^1 & x_4^1 & x_3^1 \\ x_9^1 & x_8^1 & x_7^1 & x_6^1 & x_5^1 \\ \vdots & \vdots & \vdots & \vdots & \vdots \\ x_{55}^1 & x_{54}^1 & x_{53}^1 & x_{52}^1 & x_{51}^1 \end{bmatrix} \begin{bmatrix} w_0^1 \\ w_1^1 \\ w_2^1 \\ w_3^1 \\ w_4^1 \end{bmatrix} + \begin{bmatrix} x_5^2 & x_4^2 & x_3^2 & x_2^2 & x_1^2 \\ x_7^2 & x_6^2 & x_5^2 & x_4^2 & x_3^2 \\ x_9^2 & x_8^2 & x_7^2 & x_6^2 & x_5^2 \\ \vdots & \vdots & \vdots & \vdots & \vdots \\ x_{55}^2 & x_{54}^2 & x_{53}^2 & x_{52}^2 & x_{51}^2 \end{bmatrix} \begin{bmatrix} w_0^2 \\ w_1^2 \\ w_2^2 \\ w_3^2 \\ w_4^2 \end{bmatrix} \quad (2)$$

Where the s vector represents the 26 training symbols and the $X_n^1$ matrix are samples from the signal at 407 and similarly the $X_n^2$ matrix are samples from the signal at 411. Note that the particular $t_k$ that is applied essentially determines which of the samples of the respective signal is deemed to be $x_1$, etc.

Solving this equation using the known training symbols, yields 5 taps ($w_n^1$ and $w_n^2$, n=(0, 1, . . . ,5)) for each of the linear filters 509, 511. These taps are loaded into the filters and the filters are used to process the branch samples, with the results being decimated by, respective decimators 510, 512 to provide estimates for training symbols (S hat) based on the filter taps or coefficients and branch samples. Essentially equation (2) is used to calculate the estimate of 26 training symbols using the taps or coefficients that were estimated. The outputs from the decimators, are added together at combiner 513 and represent estimates for the 26 training symbols. From the training symbol estimate, the known training symbols are subtracted by the combiner 513 to provide a timing error signal. It will be appreciated that the two outputs of the filters could be added together with the result decimated by one decimator with the output of the one decimator coupled to a further combiner to subtract the known training symbols The magnitude of the output timing error signal is squared and summed at error calculator 515 over the 26 training symbols to provide a timing error value $E(t_k)$ at 517 associated with the timing trial. The above process is repeated for additional timing trials by changing $t_k$ and repeating. At the end of all timing trials, e.g., in some embodiments 5, 10, or more, the timing trial that resulted in the best or smallest timing error value is deemed to be the appropriate filter coefficients or filter taps for the linear equalizers and have the appropriate delay term or timing parameter τ for this pair of branches. The next subset or pair of branches of branches is then used in the FIG. 5 apparatus and the above discussed process is repeated. After all subsets of branches are used all linear equalizers will have been calculated. For a two antenna system using pairs of the branches eight equalizers will be defined $\{(w_1^k, w_2^k, \tau_k), k=1,2,3,4\}$.

Figure 6:
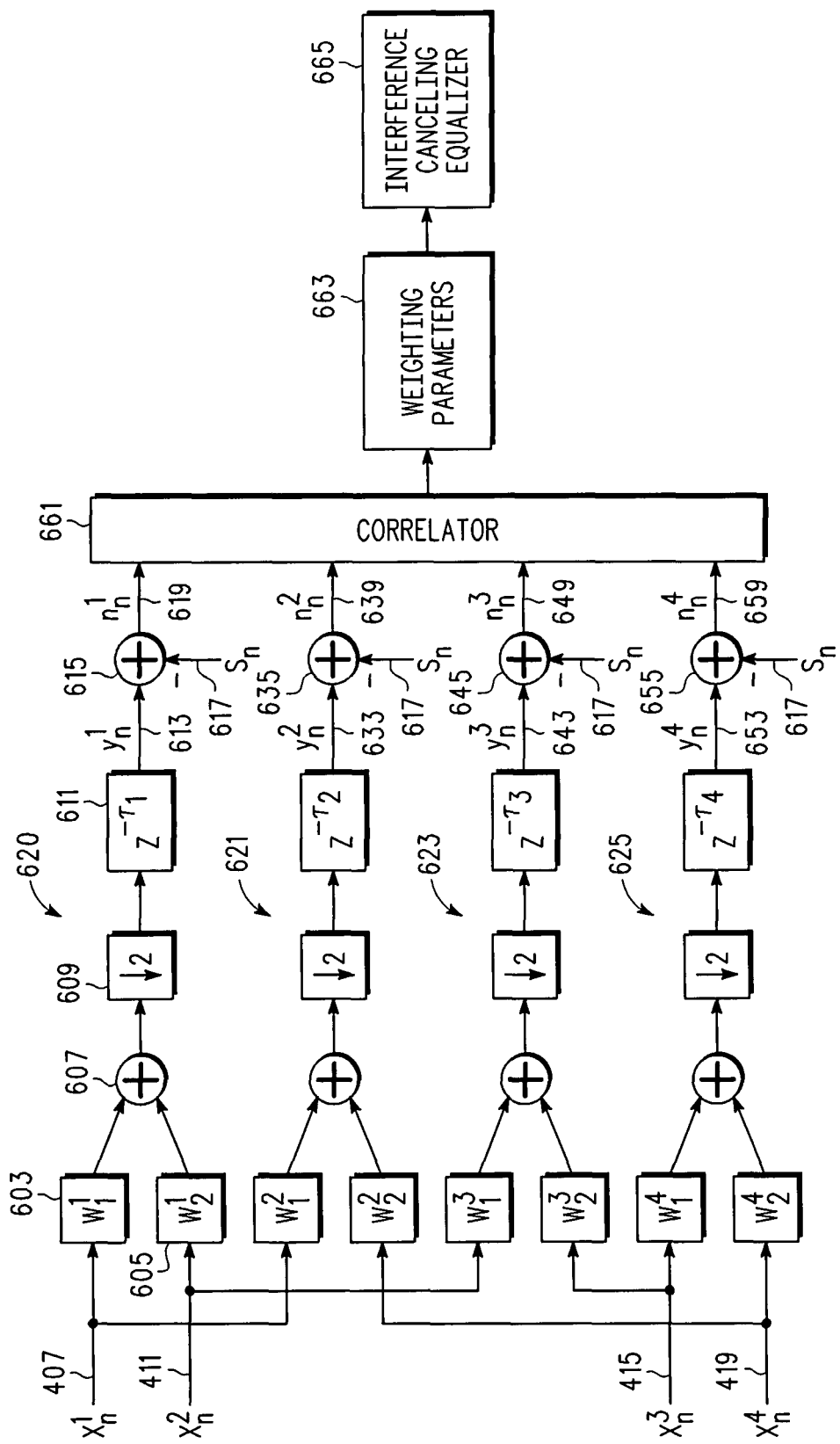
FIG. 6 depicts an apparatus for providing interference canceling equalizers for each branch in accordance with one or more embodiments.

Referring to FIG. 6, an apparatus for providing interference canceling equalizers for each branch in accordance with one or more embodiments will be discussed and described. FIG. 6 illustrates a setting for the two antenna system as noted above with reference to FIG. 4. FIG. 6 illustrates the pairs of the 4 branches which were selected, specifically 12, 14, 23, and 34, which designate the branch #s that are paired. Thus in FIG. 6 we see $x_n^1$, at 407 and $x_n^2$ at 411 are paired with these signals respectively processed by linear equalizers 603, 605 with the output combined by combiner 607. The output of combiner 607 is decimated by 2 at decimator 609 and applied to a delay stage which applies $\tau_1$ (the timing value for pair 1). The output of this delay stage is $y_n^1$ at 613, which is the soft symbols for the first pair. As can be observed in FIG. 6, the above discussed apparatus and corresponding processes for pair one 620 are essentially duplicated for each pair with the appropriate linear equalizers and appropriate timing values in the, respective paths. Thus the structure and functions generally referred to as 621 yield $y_n^2$ at 633, 623 yield $y_n^3$ at 643, and 625 yield or provide $y_n^4$ at 653. Thus four copies of soft symbols $\{y_n^1, y_n^2, y_n^3, y_n^4\}$ have been provided.

Each of these soft symbols, during the training sequence, is the summation of the training sequence $s_n$ and interference and corresponding noise $n_n^k$. The soft symbols $y_n^1$ at 613 are supplied to a combiner 615 where training symbols $s_n$ at 617 is subtracted yielding $n_n^1$ at 619. The signal at 619 is an error sequence which corresponds to the first subset or pair of branches. Similarly the soft symbols $y_n^2$ at 633 are supplied to a combiner 635 where $s_n$ at 617 is subtracted yielding $n_n^2$ at 639 (an error sequence for the second subset or pair), the soft symbols $y_n^3$ at 643 are supplied to a combiner 645 where $s_n$ at 617 is subtracted yielding $n_n^3$ at 649 (an error sequence for the third subset or pair), and the soft symbols $y_n^4$ at 653 are supplied to a combiner 655 where $s_n$ at 617 is subtracted yielding $n_n^4$ at 659 (an error sequence for the fourth subset or pair). In matrix form this can be represented as:

$$\begin{cases} y_n^1 = s_n + n_n^1 \\ y_n^2 = s_n + n_n^2 \\ y_n^3 = s_n + n_n^3 \\ y_n^4 = s_n + n_n^4 \end{cases} \Rightarrow \begin{cases} n_n^1 = y_n^1 - s_n \\ n_n^2 = y_n^2 - s_n \\ n_n^3 = y_n^3 - s_n \\ n_n^4 = y_n^4 - s_n \end{cases} \quad (3)$$

While the four error sequences (noise or AWGN) $\{n_n^1, n_n^2, n_n^3, n_n^4\}$ are independent in the time direction due to the way the pairs of equalizers were derived, they are still correlated among the sequences. Furthermore, the average power of each of $\{n_n^1, n_n^2, n_n^3, n_n^4\}$ is not equal.

Thus an optimal combining of the four copies of the soft symbols will exist. Weighting parameters or factors can be determined by finding correlations. The error sequences are applied to correlator 661 where cross correlations over the training sequence between the error sequences are determined in accordance with:

$$R_{ij} = \sum_{n=1}^{26} n_n^i n_n^j \quad (4)$$

Given the correlations, the weighting parameter function 663 determines or finds the weighting parameters. The weighting parameters or factors can be determined by using the correlations from (4) and solving the following equation for $c_1, c_2, c_3, c_4$, which are respective weighting parameters for the four branches.

$$\begin{bmatrix} R_{11} & R_{12} & R_{13} & R_{14} & \frac{1}{2} \\ R_{21} & R_{22} & R_{23} & R_{24} & \frac{1}{2} \\ R_{31} & R_{32} & R_{33} & R_{34} & \frac{1}{2} \\ R_{41} & R_{42} & R_{43} & R_{44} & \frac{1}{2} \\ 1 & 1 & 1 & 1 & 0 \end{bmatrix} \begin{bmatrix} c_1 \\ c_2 \\ c_3 \\ c_4 \\ \lambda \end{bmatrix} = \begin{bmatrix} 0 \\ 0 \\ 0 \\ 0 \\ 1 \end{bmatrix} \quad (5)$$

Given the weighting parameters an interference canceling equalizer for each branch and for the plurality of signals or two signals can be found. In one approach this amounts to simply multiplying the soft symbols $\{y_n^1, y_n^2, y_n^3, y_n^4\}$ by the respective weighting parameter $C_1, C_2, c_3, c_4$ and adding all results together. The weighting parameters are provided to the interference canceling equalizers block 665. This block or function can provide the weighting parameters directly for use via the aforementioned process of weighting the result from each pair of equalizers or the function can define a new interference canceling equalizer in accordance with the following equation:

$$\begin{cases} \hat{w}^1 = c_1 w_1^1 (n - \tau_1) + c_2 w_1^2 (n - \tau_2) \\ \hat{w}^2 = c_1 w_2^1 (n - \tau_1) + c_3 w_1^3 (n - \tau_3) \\ \hat{w}^3 = c_4 w_1^4 (n - \tau_4) + c_3 w_2^3 (n - \tau_3) \\ \hat{w}^4 = c_4 w_2^4 (n - \tau_4) + c_2 w_2^2 (n - \tau_2) \end{cases} \quad (6)$$

It will be observed that each of the the $\{\hat{w}_n^1, \hat{w}_n^2, \hat{w}_n^3, \hat{w}_n^4\}$ equalizers is a weighted combination of each linear equalizer that the corresponding branch was processed by. For example branch $x_n^1$ was processed by $\{(w_1^1, w_1^2)\}$ and the new equalizer for this branch is a weighted combination of these two equalizers. From equation (6) it will also be observed that if the linear equalizers had 5 taps the newly defined equalizers $\{\hat{w}_n^1, \hat{w}_n^2, \hat{w}_n^3, \hat{w}_n^4\}$ may have 10 taps or coefficients as a result of the different timing parameters.

Figure 7:
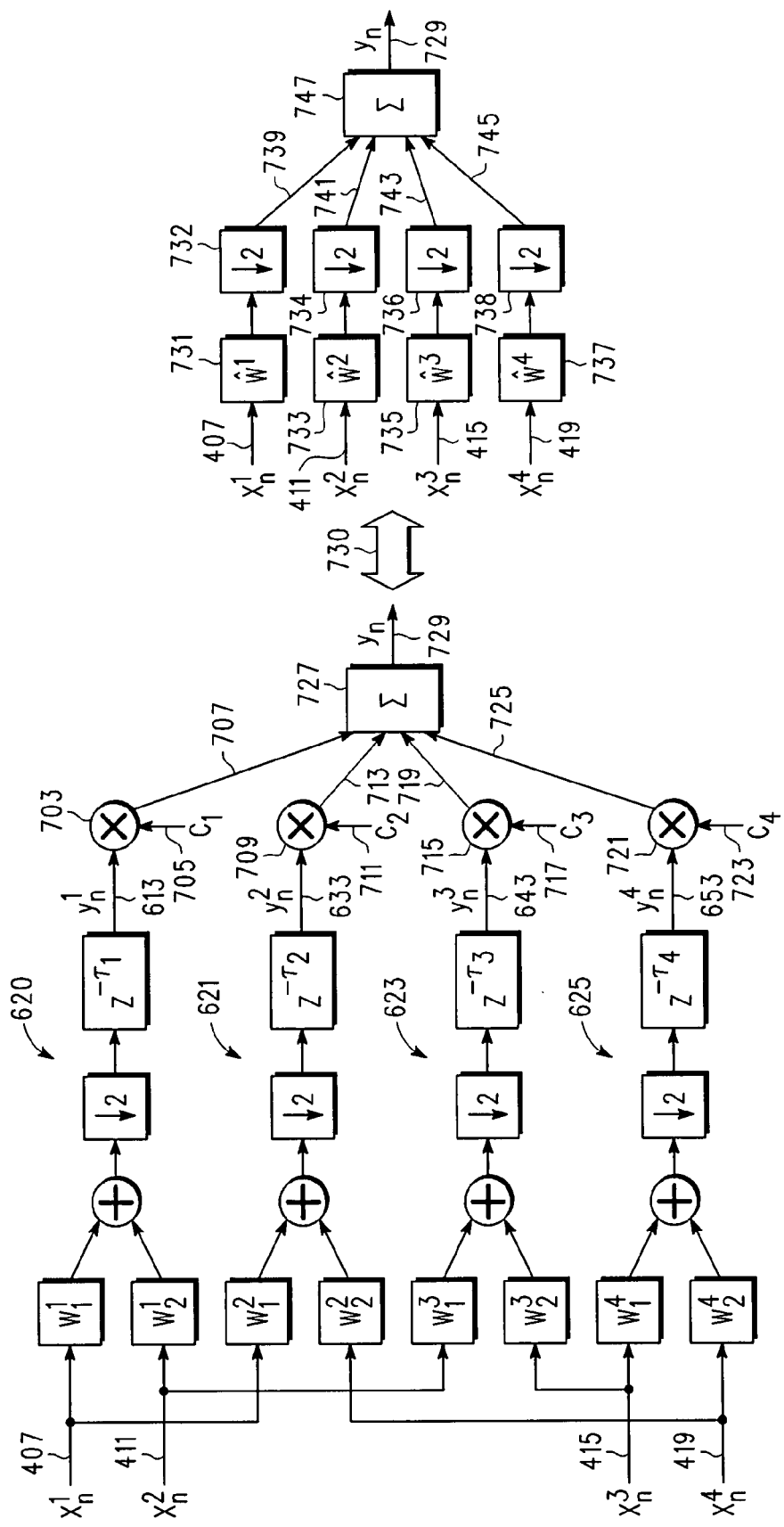
FIG. 7 shows diagrams illustrating structures for the interference canceling equalizer in a GMSK diversity receiver in accordance with one or more embodiments.

Referring to FIG. 7, diagrams illustrating these two approaches or structures for the interference canceling equalizer in a GMSK diversity receiver in accordance with one or more embodiments will be discussed and described. Much of the left hand portion of FIG. 7 is the same structure as FIG. 6 with the branch signals input at 407, 411, 415, and 419 and 620, 621, 623, 625, respectively, functioning or operating to provide soft symbols $\{y_n^1, y_n^2, y_n^3, y_n^4\}$ for the respective subset or pair of branches at 613, 633, 643, and 653. Soft symbols $y_n^1$ is applied to multiplier or weighting function 703 and weighted by weighting parameter $c_1$ at 705 to provide weighted soft symbols for this subset or first pair of branches at 707. Soft symbols $y_n^2$ is applied to multiplier or weighting function 709 and weighted by weighting parameter $c_2$ at 711 to provide weighted soft symbols for this subset or second pair of branches at 713. Soft symbols $y_n^3$ is applied to multiplier or weighting function 715 and weighted by weighting parameter $c_3$ at 717 to provide weighted soft symbols for this subset or third pair of branches at 719. Soft symbols $y_n^4$ is applied to multiplier or weighting function 721 and weighted by weighting parameter $c_4$ at 723 to provide weighted soft symbols for this subset or fourth pair of branches at 725. These results are all added together by combiner 727 to yield soft bits for the GMSK diversity receiver at 729.

Thus the left hand portion of FIG. 7 shows and illustrates an embodiment of an interference canceling equalizer for use in a diversity Gaussian Minimum Shift Keyed (GMSK) receiver. The interference canceling equalizer comprises eight linear equalizers processing four branch signals corresponding to real (I) and quadrature (Q) parts of a diversity signal comprising two GMSK received signals from two antennas. The linear equalizers are calculated from four pairs of the four branch signals, with each pair having an associated timing parameter which is determined during calculation of two linear equalizers corresponding to the pair. A weighting function 703, 709, 715, 721 is for weighting the outputs from linear equalizers as adjusted by the associated timing parameter for each pair of the four branch signals to provide four weighted soft symbols at 707, 713, 719, 725 corresponding respectively to the four pairs; and a combiner 727 for combining the four weighted soft symbols to provide soft symbols at 729 for the diversity signal.

The right hand side of FIG. 7 shows a structure that yields or is equivalent to the left hand portion as suggested by arrow 730. In this structure the branch signals are input at 407, 411, 415, and 419 and processed, respectively, by equalizers $\{\hat{w}_n^1, \hat{w}_n^2, \hat{w}_n^3, \hat{w}_n^4\}$ 731, 733, 735, 737 with the respective outputs 739, 741, 743, 745 from decimators 732, 734, 736, 738 representing soft bits corresponding to the respective branches. These are all added or summed together by combiner 747 to yield soft bits for the GMSK diversity receiver at 729. In one embodiment the right hand portion illustrates an interference canceling equalizer for use in a diversity Gaussian Minimum Shift Keyed (GMSK) receiver. The interference canceling equalizer comprises four canceling equalizers 731, 733, 735, 737 processing four branch signals corresponding to real (I) and quadrature (Q) parts of a diversity signal comprising two GMSK received signals from two antennas, to provide soft symbols corresponding to each of the four branch signals. The four equalizers are determined as a weighted combination of linear equalizers calculated for four different respective pairs of the branch signals including a timing parameter for each pair. The soft symbols for each of the four branches are coupled to a combiner 747 for combining the soft symbols to provide soft symbols corresponding to the diversity signal.

With reference to equation (2), when used for timing trials or timing search, significant resources (processing, etc) can be saved as will become evident from the following discussion. The concepts below allow for efficient calculation of $\{\hat{w}_n^1, \hat{w}_n^2, \hat{w}_n^3, \hat{w}_n^4\}$ over many timing trials. This is based on the observation that the equalizers from one timing trial to the next trial are not completely independent and thus that the calculations are also related. Below are various concepts that show an iterative approach to calculating the equalizers which has been shown to result in a process steps saving of over 80%.

The equations and concepts below can be used, e.g., for calculating first and second equalizers as performed over a plurality of time trials. As will be observed this further comprises iteratively calculating the first and second equalizer at a next time trial relying on relationships between the equalizers over the plurality of time trials.

Equation (2) can be rewritten as:

$$S = X^1 W^1 + X^2 W^2 \quad (7)$$

Where:

$$X^1 = \begin{bmatrix} x_5^1 & x_4^1 & x_3^1 & x_2^1 & x_1^1 \\ x_7^1 & x_6^1 & x_5^1 & x_4^1 & x_3^1 \\ x_9^1 & x_8^1 & x_7^1 & x_6^1 & x_5^1 \\ \vdots & \vdots & \vdots & \vdots & \vdots \\ x_{55}^1 & x_{54}^1 & x_{53}^1 & x_{52}^1 & x_{51}^1 \end{bmatrix}, X^2 = \begin{bmatrix} x_5^2 & x_4^2 & x_3^2 & x_2^2 & x_1^2 \\ x_7^2 & x_6^2 & x_5^2 & x_4^2 & x_3^2 \\ x_9^2 & x_8^2 & x_7^2 & x_6^2 & x_5^2 \\ \vdots & \vdots & \vdots & \vdots & \vdots \\ x_{55}^2 & x_{54}^2 & x_{53}^2 & x_{52}^2 & x_{51}^2 \end{bmatrix},$$

$$S = \begin{bmatrix} s_1 \\ s_2 \\ s_3 \\ \vdots \\ s_{26} \end{bmatrix}$$

$$W^1 = \begin{bmatrix} w_0^1 \\ w_1^1 \\ w_2^1 \\ w_3^1 \\ w_4^1 \end{bmatrix}, \text{ and } W^2 = \begin{bmatrix} w_0^2 \\ w_1^2 \\ w_2^2 \\ w_3^2 \\ w_4^2 \end{bmatrix}$$

Equation (7) can be written as $$S = [X^1 \quad X^2] \begin{bmatrix} W^1 \\ W^2 \end{bmatrix} \quad (8)$$

Or $$S = XW \quad (9)$$

Where $$X = [X^1 \quad X^2]$$

$$W = \begin{bmatrix} W^1 \\ W^2 \end{bmatrix}$$

The Minimum Mean Error Square solution of W in Equation (4) can be give by Equation (10)

$$(X^T X)W = X^T S \quad (10)$$

Where $$X^T = [X^1 \quad X^2]^T = \begin{bmatrix} X^{1T} \\ X^{2T} \end{bmatrix}$$

Thus Equation (5) can be written as $$\begin{bmatrix} X^{1T}X^1 & X^{1T}X^2 \\ X^{2T}X^1 & X^{2T}X^2 \end{bmatrix} \begin{bmatrix} W_1 \\ W_2 \end{bmatrix} = \begin{bmatrix} X^{1T}S \\ X^{2T}S \end{bmatrix} \quad (11)$$

Thus solving equation (2) is the same as solving equation (11). From above, this equation needed to be solved for each pair or subset of the branches and one time for each time trial for each pair. For the first time trial for the first pair of branches the cross correlations are as follows:

$$R_1 = X^{1T}X^2 \quad (12)$$

$$= \begin{bmatrix} \Sigma x^1_{(5:2:55)} x^2_{(5:2:55)} & \Sigma x^1_{(5:2:55)} x^2_{(4:2:54)} & \Sigma x^1_{(5:2:55)} x^2_{(3:2:53)} & \Sigma x^1_{(5:2:55)} x^2_{(2:2:52)} & \Sigma x^1_{(5:2:55)} x^2_{(1:2:51)} \\ * & \Sigma x^1_{(4:2:54)} x^2_{(4:2:54)} & \Sigma x^1_{(4:2:54)} x^2_{(3:2:53)} & \Sigma x^1_{(4:2:54)} x^2_{(2:2:52)} & \Sigma x^1_{(4:2:54)} x^2_{(1:2:51)} \\ * & * & \Sigma x^1_{(3:2:53)} x^2_{(3:2:53)} & \Sigma x^1_{(3:2:53)} x^2_{(2:2:52)} & \Sigma x^1_{(3:2:53)} x^2_{(1:2:51)} \\ * & * & * & \Sigma x^1_{(2:2:52)} x^2_{(2:2:52)} & \Sigma x^1_{(2:2:52)} x^2_{(1:2:51)} \\ * & * & * & * & \Sigma x^1_{(1:2:51)} x^2_{(1:2:51)} \end{bmatrix}$$

$$= \begin{bmatrix} R_{11} & R_{12} & R_{13} & R_{14} & R_{15} \\ R_{21} & R_{22} & R_{23} & R_{24} & R_{25} \\ R_{31} & R_{32} & R_{33} & R_{34} & R_{35} \\ R_{41} & R_{42} & R_{43} & R_{44} & R_{45} \\ R_{51} & R_{52} & R_{53} & R_{54} & R_{55} \end{bmatrix}$$

where $R_{ij}=R_{ji}$, and in the calculation representation, the subscript denotes a beginning address (or sample index), a step size, and an ending address.

On the next timing trial, the only change is the sample index. At timing trial 2, the corresponding correlation matrix $R_2$ can be evaluated iteratively with the results of the correlation matrix $R_1$ given in (12) as:

$$R = \begin{bmatrix} R_{11} - x^1_5 x^2_5 + x^1_{57} x^2_{57} & R_{12} - x^1_5 x^2_4 + x^1_{57} x^2_{56} & R_{13} - x^1_5 x^2_3 + x^1_{57} x^2_{55} & R_{14} - x^1_5 x^2_2 + x^1_{57} x^2_{54} & R_{15} - x^1_5 x^2_1 + x^1_{57} x^2_{53} \\ * & R_{22} - x^1_4 x^2_4 + x^1_{56} x^2_{56} & R_{23} - x^1_4 x^2_3 + x^1_{56} x^2_{55} & R_{24} - x^1_4 x^2_2 + x^1_{56} x^2_{54} & R_{25} - x^1_4 x^2_1 + x^1_{56} x^2_{53} \\ * & * & R_{33} - x^1_3 x^2_3 + x^1_{55} x^2_{55} & R_{34} - x^1_3 x^2_2 + x^1_{55} x^2_{54} & R_{35} - x^1_3 x^2_1 + x^1_{55} x^2_{53} \\ * & * & * & R_{44} - x^1_2 x^2_2 + x^1_{54} x^2_{54} & R_{45} - x^1_2 x^2_1 + x^1_{54} x^2_{53} \\ * & * & * & * & R_{55} - x^1_1 x^2_1 + x^1_{53} x^2_{53} \end{bmatrix} \quad (13)$$

It is also noticed that even on the first timing trial, the elements of the correlation matrix $R_1$ can also be calculated iterative. Since $$R_1 = \begin{bmatrix} x^1_{(5:2:55)} x^2_{(5:2:55)} & x^1_{(5:2:55)} x^2_{(4:2:54)} & x^1_{(5:2:55)} x^2_{(3:2:53)} & x^1_{(5:2:55)} x^2_{(2:2:52)} & x^1_{(5:2:55)} x^2_{(1:2:51)} \\ * & x^1_{(4:2:54)} x^2_{(4:2:54)} & x^1_{(4:2:54)} x^2_{(3:2:53)} & x^1_{(4:2:54)} x^2_{(2:2:52)} & x^1_{(4:2:54)} x^2_{(1:2:51)} \\ * & * & x^1_{(3:2:53)} x^2_{(3:2:53)} & x^1_{(3:2:53)} x^2_{(2:2:52)} & x^1_{(3:2:53)} x^2_{(1:2:51)} \\ * & * & * & x^1_{(2:2:52)} x^2_{(2:2:52)} & x^1_{(2:2:52)} x^2_{(1:2:51)} \\ * & * & * & * & x^1_{(1:2:51)} x^2_{(1:2:51)} \end{bmatrix} \quad (14)$$

$$= \begin{bmatrix} R_{11} & R_{12} & R_{13} & R_{14} & R_{15} \\ R_{21} & R_{22} & R_{23} & R_{24} & R_{25} \\ R_{31} & R_{32} & R_{33} & R_{34} & R_{35} \\ R_{41} & R_{41} & R_{43} & R_{44} & R_{45} \\ R_{51} & R_{52} & R_{53} & R_{54} & R_{55} \end{bmatrix}$$

It will also be observed that the elements along the diagonals are related, thus can be calculated iteratively. For example the main diagonal can be calculated as follow:

$$\begin{cases} R_{11} = \sum_{k=5:2:55} x_k^1 x_k^2 \\ R_{22} = \sum_{k=4:2:54} x_k^1 x_k^2 \\ R_{33} = R_{11} - x_{55}^1 x_{55}^2 + x_3^1 x_3^2 \\ R_{44} = R_{22} - x_{54}^1 x_{54}^2 + x_2^1 x_2^2 \\ R_{55} = R_{33} - x_{53}^1 x_{53}^2 + x_1^1 x_1^2 \end{cases} \quad (15)$$

And the second, third, fourth, and fifth diagonal as, respectively:

$$\begin{cases} R_{12} = \sum x_{5:2:55}^1 x_{4:2:54}^2 \\ R_{23} = \sum x_{4:2:54}^1 x_{3:2:53}^2 \\ R_{34} = R_{12} - x_{55}^1 x_{54}^2 + x_3^1 x_2^2 \\ R_{45} = R_{23} - x_{54}^1 x_{53}^2 + x_2^1 x_1^2 \end{cases} \quad (16)$$

$$\begin{cases} R_{13} = \sum x_{5:2:55}^1 x_{3:2:53}^2 \\ R_{24} = \sum x_{4:2:54}^1 x_{2:2:52}^2 \\ R_{35} = R_{13} - x_{55}^1 x_{53}^2 + x_3^1 x_1^2 \end{cases} \quad (17)$$

$$\begin{cases} R_{14} = \sum x_{5:2:55}^1 x_{2:2:52}^2 \\ R_{25} = \sum x_{4:2:54}^1 x_{1:2:51}^2 \end{cases} \quad (18)$$

$$R_{15} = \sum x_{5:2:55}^1 x_{1:2:51}^2 \quad (19)$$

Turning our attention to the cross correlation in equation (11):

$$\begin{bmatrix} p_1 \\ \vdots \\ p_5 \\ p_6 \\ \vdots \\ p_{10} \end{bmatrix} = \begin{bmatrix} X^{1T} \\ X^{2T} \end{bmatrix} \begin{bmatrix} s_1 \\ s_2 \\ \vdots \\ s_{26} \end{bmatrix} \quad (20)$$

There are also iterative relationships between timing trials as noted below:

For timing trial one:
$$\begin{bmatrix} p_1^1 \\ p_2^1 \\ p_3^1 \\ p_4^1 \\ p_5^1 \\ p_6^1 \\ p_7^1 \\ p_8^1 \\ p_9^1 \\ p_{10}^1 \end{bmatrix} = \begin{bmatrix} \sum x_{5:2:55}^1 s_{1:26} \\ \sum x_{4:2:54}^1 s_{1:26} \\ \sum x_{3:2:53}^1 s_{1:26} \\ \sum x_{2:2:52}^1 s_{1:26} \\ \sum x_{1:2:51}^1 s_{1:26} \\ \sum x_{7:2:57}^2 s_{1:26} \\ \sum x_{6:2:56}^2 s_{1:26} \\ \sum x_{3:2:53}^2 s_{1:26} \\ \sum x_{2:2:52}^2 s_{1:26} \\ \sum x_{1:2:51}^2 s_{1:26} \end{bmatrix} \quad (21)$$

For timing trial two:
$$\begin{bmatrix} p_1^2 \\ p_2^2 \\ p_3^2 \\ p_4^2 \\ p_5^2 \\ p_6^2 \\ p_7^2 \\ p_8^2 \\ p_9^2 \\ p_{10}^2 \end{bmatrix} = \begin{bmatrix} \sum x_{7:2:57}^1 s_{1:26} \\ \sum x_{6:2:56}^1 s_{1:26} \\ p_1^1 \\ p_3^1 \\ p_5^1 \\ \sum x_{7:2:57}^2 s_{1:26} \\ \sum x_{6:2:56}^2 s_{1:26} \\ p_6^1 \\ p_7^1 \\ p_8^1 \end{bmatrix} \quad (22)$$

For timing trial three:
$$\begin{bmatrix} p_1^3 \\ p_2^3 \\ p_3^3 \\ p_4^3 \\ p_5^3 \\ p_6^3 \\ p_7^3 \\ p_8^3 \\ p_9^3 \\ p_{10}^3 \end{bmatrix} = \begin{bmatrix} \sum x_{9:2:57}^1 s_{1:26} \\ \sum x_{8:2:58}^1 s_{1:26} \\ p_1^2 \\ p_3^2 \\ p_5^2 \\ \sum x_{9:2:57}^2 s_{1:26} \\ \sum x_{8:2:58}^2 s_{1:26} \\ p_6^2 \\ p_7^2 \\ p_8^2 \end{bmatrix} \quad (23)$$

For timing trial four:
$$\begin{bmatrix} p_1^4 \\ p_2^4 \\ p_3^4 \\ p_4^4 \\ p_5^4 \\ p_6^4 \\ p_7^4 \\ p_8^4 \\ p_9^4 \\ p_{10}^4 \end{bmatrix} = \begin{bmatrix} \sum x_{11:2:61}^1 s_{1:26} \\ \sum x_{10:2:60}^1 s_{1:26} \\ p_1^3 \\ p_3^3 \\ p_5^3 \\ \sum x_{11:2:61}^2 s_{1:26} \\ \sum x_{10:2:60}^2 s_{1:26} \\ p_6^3 \\ p_7^3 \\ p_8^3 \end{bmatrix} \quad (24)$$

For timing trial five:
$$\begin{bmatrix} p_1^5 \\ p_2^5 \\ p_3^5 \\ p_4^5 \\ p_5^5 \\ p_6^5 \\ p_7^5 \\ p_8^5 \\ p_9^5 \\ p_{10}^5 \end{bmatrix} = \begin{bmatrix} \sum x_{13:2:63}^1 s_{1:26} \\ \sum x_{12:2:62}^1 s_{1:26} \\ p_1^4 \\ p_3^4 \\ p_5^4 \\ \sum x_{13:2:63}^2 s_{1:26} \\ \sum x_{12:2:62}^2 s_{1:26} \\ p_6^4 \\ p_7^4 \\ p_8^4 \end{bmatrix} \quad (25)$$

Furthermore, it is observed that additional duplicated calculations exists in solving for the 4 equalizers $\{(w_1^k, w_2^k, \tau_k), k=1,2,3,4\}$ with the 4 pairs of branches on each timing trial. With the notation of Equation (11), the 4 equations to solve the equalizers $\{(w_1^k, w_2^k, \tau_k), k=1,2,3,4\}$ are listed as follows:

$$\begin{bmatrix} X^{1T}X^1 & X^{1T}X^2 \\ X^{2T}X^1 & X^{2T}X^2 \end{bmatrix} \begin{bmatrix} W_1^1 \\ W_2^1 \end{bmatrix} = \begin{bmatrix} X^{1T}S \\ X^{2T}S \end{bmatrix} \quad (26)$$

$$\begin{bmatrix} X^{1T}X^1 & X^{1T}X^4 \\ X^{4T}X^1 & X^{4T}X^4 \end{bmatrix} \begin{bmatrix} W_1^2 \\ W_2^2 \end{bmatrix} = \begin{bmatrix} X^{1T}S \\ X^{4T}S \end{bmatrix} \quad (27)$$

$$\begin{bmatrix} X^{2T}X^2 & X^{2T}X^3 \\ X^{3T}X^2 & X^{3T}X^3 \end{bmatrix} \begin{bmatrix} W_1^3 \\ W_2^3 \end{bmatrix} = \begin{bmatrix} X^{2T}S \\ X^{3T}S \end{bmatrix} \quad (28)$$

$$\begin{bmatrix} X^{3T}X^3 & X^{3T}X^4 \\ X^{4T}X^3 & X^{4T}X^4 \end{bmatrix} \begin{bmatrix} W_1^4 \\ W_2^4 \end{bmatrix} = \begin{bmatrix} X^{3T}S \\ X^{4T}S \end{bmatrix} \quad (29)$$

It can be seen that, the $X^{2T}X^1 = (X^{1T}X^2)^T$, thus the calculation of $X^{2T}X^1$ can be saved. Similar saving exists for $X^{4T}X^1$, $X^{3T}X^2$ and $X^{4T}X^3$. Meanwhile, $X^{1T}X^1$ exists both in equation (26) and Equation (27), $X^{2T}X^2$ exists both in Equation (26) and (28), and $X^{3T}X^3$ exists both in Equation (28) and Equation (29), $X^{4T}X^4$ exists both in Equation (27) and Equation (29). Removing these duplicated calculations will result additional efficiency gain.

It will be appreciated that the above described functions and structures may be implemented in one or more integrated circuits. For example, many or all of the functions can be implemented in a digital signal processor with appropriate capabilities. Using the techniques and concepts discussed and described herein significantly improves interference cancellation in a diversity GMSK receiver This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a diversity antenna Gaussian Minimum Shift Keyed (GMSK) receiver of determining interference canceling equalizers, the method comprising:
   providing a plurality of GMSK received signals;
   de-rotating and splitting each of the plurality of GMSK received signals into in-phase (I) and quadrature (Q) parts to provide a multiplicity of real valued branches;
   calculating linear equalizers including calculating corresponding filter taps for each of a multiplicity of subsets of the multiplicity of real valued branches; and
   providing an interference canceling equalizer for each of the multiplicity of real valued branches, each interference canceling equalizer corresponding to a weighted combination of the linear equalizers.

2. The method of claim 1 further comprising:
   determining corresponding weighting factors associated with each of the interference canceling equalizers; and
   wherein the providing an interference canceling equalizer for each of the multiplicity of real valued branches, each interference canceling equalizer corresponding to a weighted combination of the linear equalizers further comprises weighting the linear equalizers in accordance with the corresponding weighting factors.

3. The method of claim 1 further comprising:
   finding an error sequence corresponding to the linear equalizers for each of the multiplicity of subsets to provide a multiplicity of error sequences, the error sequence depending on a training sequence; and
   wherein the providing each of the interference canceling equalizers further comprises weighting the linear equalizers dependent on relationships among the multiplicity of the error sequences.

4. The method of claim 3 further comprising:
   determining correlations between the multiplicity of error sequences corresponding to the linear equalizers for each of the multiplicity of subsets; and
   determining, using the correlations, corresponding weighting parameters for weighting the linear equalizers to provide the interference canceling equalizer for each of the multiplicity of real valued branches.

5. The method of claim 1 wherein the calculating linear equalizers comprises determining a multiplicity of filter taps for each equalizer and a timing parameter for each subset.

6. The method of claim 1:
   wherein the providing a plurality of GMSK received signals further comprises providing a first and a second GMSK received signal, each including a training symbol sequence;
   wherein the de-rotating and splitting comprises de-rotating and splitting each of the first and the second GMSK received signals into corresponding in-phase and quadrature parts to provide four real valued branches; and
   wherein the calculating linear equalizers including calculating corresponding filter taps comprises calculating two equalizers including calculating corresponding filter taps for each pair of four pairs of the four real valued branches.

7. The method of claim 1 wherein the calculating linear equalizers further comprises calculating the linear equalizers at each of a plurality of time trials to determine a timing parameter associated with each of the multiplicity of subsets.

8. The method of claim 7 wherein the timing parameter is selected as the timing trial that minimizes a timing error value.

9. A method of interference cancellation in a diversity Gaussian Minimum Shift Keyed (GMSK) receiver, the method comprising:
   providing a first and a second GMSK received signal from a, respective, first and second antenna, each of the first and the second GMSK received signal including a training symbol sequence;
   de-rotating and splitting the first and the second GMSK received signal into, respective and corresponding in-phase (I) and quadrature (Q) parts to provide four real valued branches;
   calculating first and second linear equalizers including calculating corresponding filter taps for each of four unique pairs of branches selected from the four real valued branches to provide eight linear equalizers; and
   providing an interference canceling equalizer for each of the four real valued branches, each interference canceling equalizer corresponding to a weighted combination of two of the eight linear equalizers; and
   processing one of the four real valued branches to cancel interference.

10. The method of claim 9 further comprising:
  determining corresponding weighting factors associated with each of the interference canceling equalizers; and
  wherein the providing an interference canceling equalizer for each of the four real valued branches, each interference canceling equalizer corresponding to a weighted combination of two of the eight linear equalizers further comprises weighting the two of the eight linear equalizers in accordance with the corresponding weighting factors.

11. The method of claim 9 further comprising:
  finding an error sequence corresponding to the first and second linear equalizers for each of the four unique pairs of branches to provide four error sequences; and
  wherein the providing each of the interference canceling equalizers further comprises weighting the linear equalizers dependent on relationships among the four error sequences.

12. The method of claim 11 further comprising:
  determining correlations between the four error sequences; and
  determining, using the correlations, corresponding weighting parameters for weighting the two of the eight linear equalizers to provide the interference canceling equalizer for each of the four real valued branches.

13. The method of claim 9 wherein the calculating first and second linear equalizers including calculating corresponding filter taps further comprises determining a plurality of filter taps for each linear equalizer and a timing parameter for the first and the second linear equalizer for each unique pair of branches.

14. The method of claim 9 wherein the calculating first and second linear equalizers including calculating corresponding filter taps further comprises calculating the first and second linear equalizers for each of the four unique pairs at each of a plurality of time trials to determine a timing parameter associated with the first and second linear equalizer for each of the four unique pairs.

15. The method of claim 14 wherein the timing parameter is selected as the timing trial that minimizes a timing error value determined over a known training sequence.

16. The method of claim 9 wherein the calculating and the providing are performed using the training sequence observations corresponding to the first and the second GMSK received signal as compared to a known training sequence.

17. The method of claim 9 wherein the calculating first and second linear equalizers including calculating corresponding filter taps is performed over a plurality of time trials and further comprises iteratively calculating the first and second linear equalizer including calculating corresponding filter taps at a next time trial relying on relationships between the eight equalizers over the plurality of time trials.

18. An interference canceling equalizer in a diversity Gaussian Minimum Shift Keyed (GMSK) receiver, the interference canceling equalizer comprising,
  eight linear equalizers processing four branch signals corresponding to real (I) and quadrature (Q) parts of a diversity signal comprising two GMSK received signals from two antennas, wherein the eight linear equalizers including corresponding filter taps are calculated from four pairs of the four branch signals, with each pair having an associated timing parameter determined during calculation of two linear equalizers corresponding to the pair; and
  a weighting function for weighting the outputs from linear equalizers as adjusted by the associated timing parameter for each pair of the four branch signals to provide four weighted soft symbols corresponding, respectively, to the four pairs; and
  a combiner for combining the four weighted soft symbols to provide soft symbols for the diversity signal.

19. An interference canceling equalizer in a diversity Gaussian Minimum Shift Keyed (GMSK) receiver, the interference canceling equalizer comprising,
  four canceling equalizers processing four branch signals corresponding to real (I) and quadrature (Q) parts of a diversity signal, the diversity signal comprising two GMSK received signals from two antennas, to provide soft symbols corresponding to each of the four branch signals, the four canceling equalizers determined as a weighted combination of linear equalizers, where the linear equalizers including corresponding filter taps are calculated for four different respective pairs of the branch signals and a timing parameter is calculated for each pair; and
  a combiner for combining the soft symbols corresponding to each of the four branch signals, to provide soft symbols corresponding to the diversity signal.

* * * * *